United States Patent [19]

Nakamura et al.

[11] Patent Number: 4,525,744
[45] Date of Patent: Jun. 25, 1985

[54] VIEWFINDER OPTICAL ARRANGEMENT OF A CAMERA

[75] Inventors: Soichi Nakamura, Kamakura; Kunio Konno, Yokohama, both of Japan

[73] Assignee: Nippon Kogaku K.K., Tokyo, Japan

[21] Appl. No.: 416,090

[22] Filed: Sep. 8, 1982

[30] Foreign Application Priority Data

Sep. 18, 1981 [JP] Japan .................................. 56-146083

[51] Int. Cl.³ .......................... H04N 9/04; G03B 19/14
[52] U.S. Cl. ....................................... 358/224; 358/55; 354/166; 354/219
[58] Field of Search .................. 358/224, 225, 44, 55; 354/162, 163, 166, 219

[56] References Cited

U.S. PATENT DOCUMENTS

| 3,440,943 | 2/1969 | Sauer | 354/219 |
| 3,498,198 | 3/1970 | Fujii | 354/219 |
| 3,945,034 | 3/1976 | Suzuki | 358/55 |
| 4,381,521 | 4/1983 | Iida | 358/224 |

FOREIGN PATENT DOCUMENTS 74269  6/1980  Japan .................................. 358/224

Primary Examiner—Tommy P. Chin
Attorney, Agent, or Firm—Shapiro and Shapiro

[57] ABSTRACT

A beam splitter extracts a light beam from light passing through a picture-taking lens system, and a viewfinder optical system directs the light beam to a viewfinder eyepiece. The optical system includes a focus screen, a master lens for imaging the light beam on the focus screen, a pentaroof prism disposed between the master lens and the focus screen, and an eyepiece for observing therethrough the image on the focus screen.

8 Claims, 6 Drawing Figures

VIEWFINDER OPTICAL ARRANGEMENT OF A CAMERA

BACKGROUND OF THE INVENTION

1. Field of the Invention

This invention relates to an optical arrangement of a camera for observing therethrough an object to be photographed, and more particularly to a viewfinder optical arrangement for taking out part of a picture-taking light beam from within the optical path of a picture-taking lens and confirming therethrough the picture-taking field of view by this light beam, and especially an optical arrangement suitable for a video camera or a cine-camera.

2. Description of the Prior Art

An ordinary video camera, as shown in FIG. 1 of the accompanying drawings, generally forms an image on an image pick-up tube 15 with the aid of a picture-taking lens comprising a forward lens group or unit 11 and a rearward lens group or unit 12. A TTL viewfinder is designed such that part of a picture-taking light beam is reflected by a beam splitter such as a half-transmitting prism 10 provided in the optical path between the forward lens group 11 and the rearward lens group 12, an inverted image is formed on a focus screen 4 by a viewfinder master lens 2 via a reflecting mirror 3, an erect image is formed on another focus screen 6 by a relay lens 5 and the erect image on the focus screen 6 is observed by the observer's eye E through an eyepiece 7. The fact that such a relay lens is required has led to a very great length of the optical path of the viewfinder optical arrangement, and this has been disadvantageous to making the entire camera compact.

SUMMARY OF THE INVENTION

It is an object of the present invention to realize compactness of the arrangement and to provide a viewfinder optical arrangement of a camera which may form a clear image.

The present invention includes a beam splitter disposed in the optical path of a picture-taking lens for extracting a light beam from light passed through the picture-taking lens, and a viewfinder optical system for directing the light beam to a viewfinder eyepiece. The optical system has a focus screen, a master lens for imaging the light beam on the focus screen, and a pentaroof prism disposed between the master lens and the focus screen, and an erect image is formed on the focus screen by the pentaroof prism.

The invention will become more fully apparent from the following detailed description thereof taken in conjunction with the accompanying drawings.

DESCRIPTION OF THE PREFERRED EMBODIMENTS

The invention will hereinafter be described with respect to some embodiments thereof.

Figure 1:
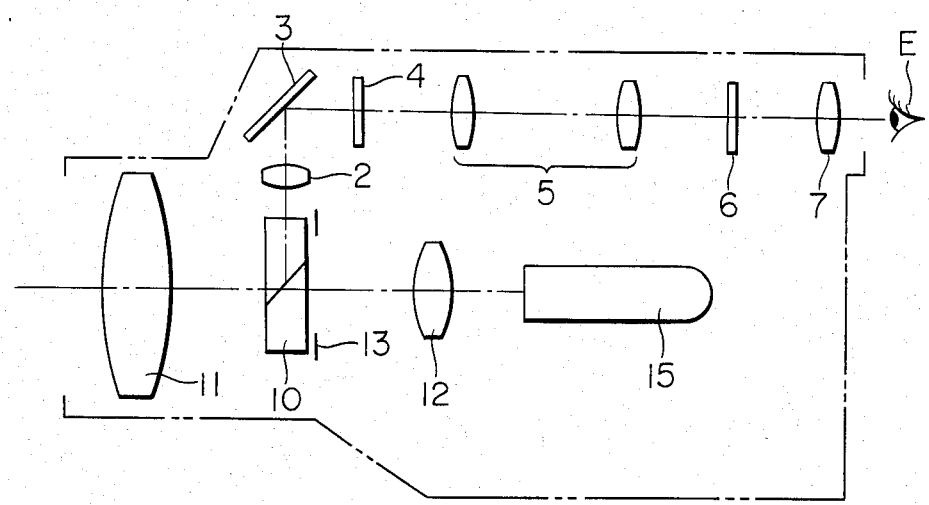
FIG. 1 is a schematic cross-sectional view showing the optical arrangement of a video camera according to the prior art.
Figure 2:
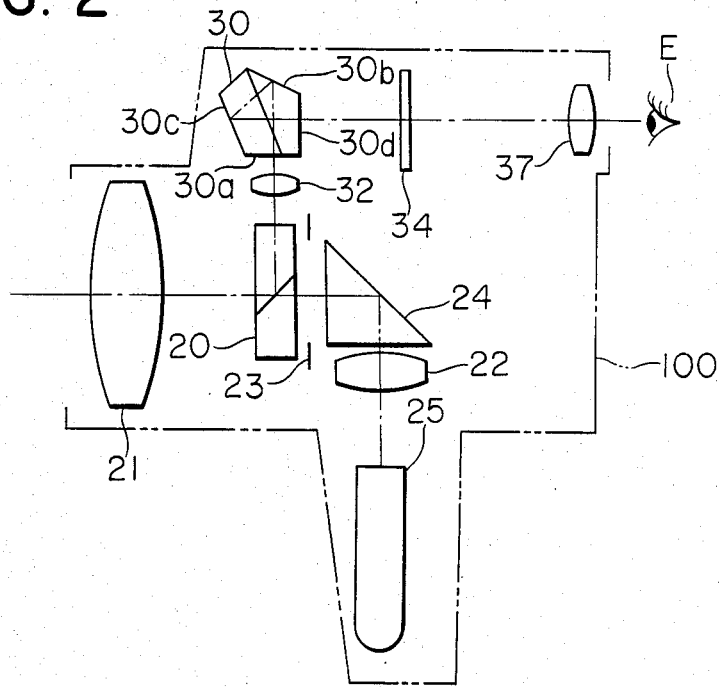
FIG. 2 is a schematic cross-sectional view showing the optical arrangement of a video camera according to an embodiment of the present invention.

A video camera 100 shown in FIG. 2 has a picture-taking lens comprising a forward lens group or unit 21 and a rearward lens group or unit 22, and a beam splitter 20 for dividing a viewfinder optical path and a rectangular prism 24 for reflecting a picture-taking light beam perpendicularly are provided between the two lens groups. An image pick-up tube 25 is vertically disposed along the optical axis bent by the rectangular prism 24. The forward lens group 21 comprises a plurality of lenses, not shown, and serves as a magnification changing lens group and a focusing lens group, and the rearward lens group 22 serves as a master lens, and a stop 23 is provided between the two lens groups. The light beam for the viewfinder reflected by the beam splitter 20 passes through a viewfinder master lens 32 and is reflected by a first reflecting surface 30b of a pentaroof prism 30 and a second reflecting surface 30c thereof which is a roof surface, whereafter it forms an erect image on a focus screen 34. This erect image may be observed by the observer's eye E through an eyepiece 37.

In such a viewfinder optical system, the optical path from the beam splitter 20 to the focus screen 34 can be prolonged by bending the optical path in the pentaroof prism 30 and therefore, the focal length of the viewfinder master lens 32 can be made longer than that of the master lens 22 of the picture-taking lens system to thereby make the image on the focus screen 34 larger than the image formed on the image pick-up tube 25. Accordingly, to obtain the same degree of viewfinder magnification as the conventional viewfinder optical system, the magnification by the eyepiece 37 can be made smaller than the conventional one and therefore, the refractive power of the eyepiece can become small to make the construction simple. Moreover, the enlargement magnification by the eyepiece 37 is smaller than the conventional one and therefore, even if dust or the like adheres to the focus plate 34, it cannot be conspicuous and a clearer viewfinder field of view can be obtained.

In the viewfinder optical system of the above-described construction, the pentaroof prism can be formed more compactly by the roof surface of the pentaroof prism 30 being provided in the second reflecting surface 30c, namely, the surface facing the object side, rather than in the first reflecting surface 30b with respect to the incident light. This will hereinafter be described.

Figure 3:
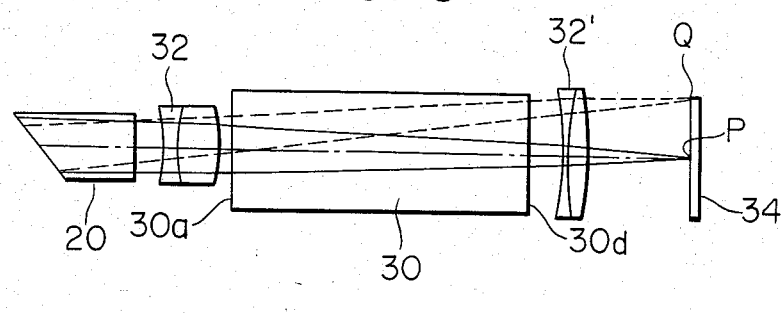
FIG. 3 is a developed optical path view of the viewfinder optical system according to an embodiment of the present invention.
Figure 4:
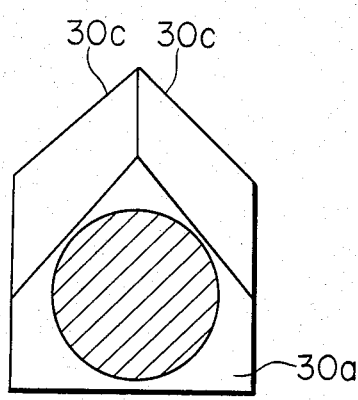
FIGS. 4 and 5 show the cross-sectional shapes of an effective light beam reaching a focus screen on the entrance surface and the exit surface of a pentaroof prism.
Figure 5:
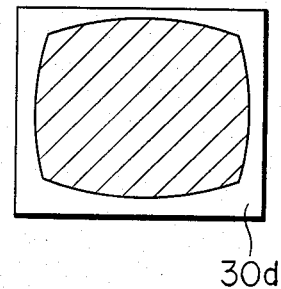

Referring to FIG. 3, there is shown a developed optical path from the beam splitter 20 of the optical system of FIG. 2 to the focus screen 34. In FIG. 3, a light beam reaching the central point P of the field of view is indicated by solid lines and a light beam reaching the marginal point Q of the field of view is indicated by dotted lines. An auxiliary positive lens 32' is provided between the pentaroof prism 30 and the focus screen 34. This auxiliary lens serves as a field lens and also performs correction of lateral chromatic aberration, and an object image is formed on the focus screen 34 by a combined system comprising the auxiliary lens 32' and the viewfinder master lens 32. The focus screen 34 is provided with a square view field frame, not shown, for prescribing the picture-taking range, and the cross-sectional shape of the effective light beam reaching the focus screen 34 becomes as shown in FIGS. 4 and 5 on the entrance surface 30a and the exit surface 30d of the pentaroof prism. That is, the area of the effective light beam on the exit surface 30d of the pentaroof prism 30 is the sum of the areas through which passes the light beam condensed at every point on the focus screen 34, and is substantially rectangular as indicated by hatching in FIG. 5 reflecting the fact that the effective area of the focus screen 34 is square. On the other hand, the effective light beam area on the entrance surface 30a of the pentaroof prism 30 is substantially circular as indicated by hatching in FIG. 4. The reason for this is that the effective image height on the focus screen 34 differs depending on the bearing that the area through which the effective light beam passes becomes non-isotropic as shown in FIG. 5, and observing the light beam reaching the central point P of the field of view and the light beam reaching the marginal point Q of the field of view, their path areas are spaced apart from each other on the exit surface 30d and are close to each other on the entrance surface 30a. That is, the variation which the effective image height imparts to the position of the area through which the light beam passes is strong on the exit surface and weak on the entrance surface. Therefore, the effective light beam area is approximate to a circle on the entrance surface and approximate to a rectangle on the exit surface.

Accordingly, if it is taken into consideration that where one of the two reflecting surfaces of the pentaroof prism is formed into a roof surface, one of two transmitting surfaces which function as the entrance surface or the exit surface of the pentaroof prism necessarily becomes pentagonal, forming into a pentagonal shape the surface in which the shape of the effective area is circular rather than square can make that surface smaller and also can make the shape of the entire prism smaller. That is, in the present invention, as already shown in FIG. 4, if the second reflecting surface 30c as a pentaroof prism is formed into a roof surface so that the entrance surface 30a of the pentaroof prism is pentagonal, the size of this pentagonal entrance surface 30a may sufficiently be a pentagon which circumscribes the approximately circular effective light beam area on this surface, and may be smaller than the pentagon circumscribing the rectangle and therefore, the pentaroof prism of the present invention can be made smaller than the conventional pentaroof prism in which the first reflecting surface is formed into a roof surface.

Figure 6:
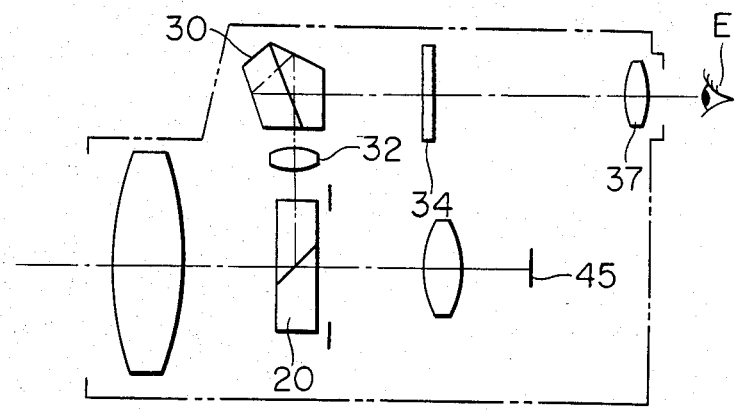
FIG. 6 is a schematic cross-sectional view showing the optical arrangement of a camera according to another embodiment of the present invention.

Such a compact optical arrangement can further lead to compactness of an entire camera by being applied to a camera whose dimensions have been reduced by disposing the image pick-up tube vertically as shown in FIG. 2. The optical arrangement of the present invention, as shown in FIG. 6, can suitably be combined with a photographic apparatus using a solid state image sensing element such as CCD (charge coupled device). The image sensing element 45 in this case is much smaller than the conventional image pick-up tube and therefore the photographic apparatus itself also is compact and thus, the compact viewfinder optical system according to the present invention becomes more effective and the configuration of the entire camera can be formed compactly as indicated by the dot-dash line in FIG. 6.

We claim:
1. An optical arrangement of a camera comprising:
 (a) a picture-taking lens system;
 (b) a beam splitter for extracting a light beam from light passing through said picture-taking lens system; and
 (c) a viewfinder optical system for directing said light beam to a viewfinder eyepiece, said optical system including focus screen means, a master lens for imaging said light beam on said focus screen means, pentaroof prism means disposed between said master lens and said focus screen means for forming an erect image to be viewed, and an eyepiece for observing therethrough an image on said focus screen means, said pentaroof prism means having an entrance surface opposed to said master lens, an exit surface substantially orthogonal to said entrance surface, a first reflecting surface for reflecting the light beam from said entrance surface, and a second reflecting surface for reflecting the light beam from said first reflecting surface toward said exit surface, said second reflecting surface being formed by a roof surface comprising two flat surfaces intersecting each other.

2. An optical arrangement according to claim 1, wherein said picture-taking lens system has a forward lens unit and a rearward lens unit, and said master lens has a focal length longer than the focal length of said rearward lens unit.

3. An optical arrangement according to claim 1, wherein said picture-taking lens system has a forward lens unit and a rearward lens unit, and said beam splitter is disposed between said forward lens unit and said rearward lens unit.

4. A video camera comprising:
 (a) a picture-taking lens system having a forward lens unit and a rearward lens unit, said forward and rearward lens units having different optical axes orthogonal to each other;
 (b) reflecting means provided in intersecting relationship with said optical axis of said forward lens unit to direct a light beam passed through said forward lens unit to said rearward lens unit,
 (c) image pick-up means having a light-receiving surface substantially orthogonal to the optical axis of said rearward lens unit;
 (d) a beam splitter disposed between said forward lens unit and said reflecting means for extracting a light beam from light passed through said forward lens unit; and
 (e) a viewfinder optical system for directing said light beam to a viewfinder eyepiece, said optical system including focus screen means, a master lens for imaging said light beam on said focus screen means, pentaroof prism means disposed between said master lens and said focus screen means, and an eyepiece for observing therethrough an image on said focus screen means.

5. A video camera according to claim 4, wherein said beam splitter includes means for reflecting said light beam in a direction opposite to the direction of the light beam directed to the light-receiving surface of said image pick-up means by said reflecting means, and said pentaroof prism means has a first reflecting surface for reflecting the light beam from said beam splitter and a second reflecting surface for reflecting the light from said first reflecting surface in the direction of the optical axis of said forward lens unit.

6. A video camera according to claim 4, wherein said pentaroof prism means has an entrance surface opposed to said master lens, an exit surface substantially orthogonal to said entrance surface, a first reflecting surface for reflecting the light beam from said entrance surface, and a second reflecting surface for reflecting the light beam from said first reflecting surface toward said exit surface, said second reflecting surface being formed by a roof surface comprising two flat surfaces intersecting each other.

7. A video camera according to claim 4, wherein said master lens has a focal length longer than the focal length of said rearward lens unit.

8. A video camera comprising:
(a) a picture-taking lens system having a forward lens unit and a rearward lens unit, said forward and rearward lens units having different optical axes orthogonal to each other;
(b) image pick-up means having a light-receiving surface substantially orthogonal to the optical axis of said rearward lens unit;
(c) beam splitter means disposed between said forward and rearward lens units for extracting a light beam from light passed through said forward lens unit; and
(d) a viewfinder optical system for directing said light beam to a viewfinder eyepiece, said optical system including focus screen means, a master lens for imaging said light beam on said focus screen means, and pentaroof prism means disposed between said master lens and said focus screen means, said pentaroof prism means having an entrance surface opposed to said master lens, an exit surface substantially orthogonal to said entrance surface, a flat reflecting surface opposed to said entrance surface for reflecting the light beam from said entrance surface, and a roof surface opposed to said exit surface and comprising two flat surfaces intersecting each other for reflecting the light beam from said flat reflecting surface toward said exit surface.

* * * * *